United States Patent [19]

Plummer et al.

[11] 3,992,018

[45] Nov. 16, 1976

[54] METHOD AND APPARATUS FOR USE IN CLEANING A GRAMOPHONE DISC

[75] Inventors: Dexter Robert Plummer, Ongar; Gerald Avison; Colin Howard Stanwell-Smith, both of Victoria Park; Keith Douglas Ridler, Fulbourn, all of England

[73] Assignee: Strathearn Audio Limited, Belfast, Northern Ireland

[22] Filed: Jan. 31, 1975

[21] Appl. No.: 546,085

[30] Foreign Application Priority Data

Feb. 5, 1974 United Kingdom ................. 5267/74

[52] U.S. Cl. ................................ 274/47; 15/256.5; 274/2

[51] Int. Cl.[2] .......................................... G11B 3/58

[58] Field of Search .................. 274/2, 47; 15/21 A, 15/21 B, 21 C, 256.5

[56] References Cited

UNITED STATES PATENTS

| | | | |
|---|---|---|---|
| 1,200,154 | 10/1916 | Wisniewski | 274/47 |
| 2,166,986 | 7/1939 | Dally | 274/2 |
| 2,294,660 | 9/1942 | Hess | 274/47 |
| 2,311,481 | 2/1943 | Sinclair | 274/47 |
| 2,976,551 | 3/1961 | Watts | 274/47 X |
| 3,185,485 | 5/1965 | Brubaker | 274/47 |
| 3,203,701 | 8/1965 | Rosenthal | 274/47 |
| 3,609,721 | 9/1971 | Meneley | 274/47 X |

*Primary Examiner*—Charles E. Phillips
*Attorney, Agent, or Firm*—Cushman, Darby & Cushman

[57] ABSTRACT

A combination of a turntable for playing phonograph records, a lid covering the turntable, tone arm for tracking record grooves, and a cleaning element mounted on the lid for movement into contact with a constant annular area on the top side of the record for cleaning. A counterbalance weight controls the pressure of the cleaning element upon the record.

3 Claims, 1 Drawing Figure

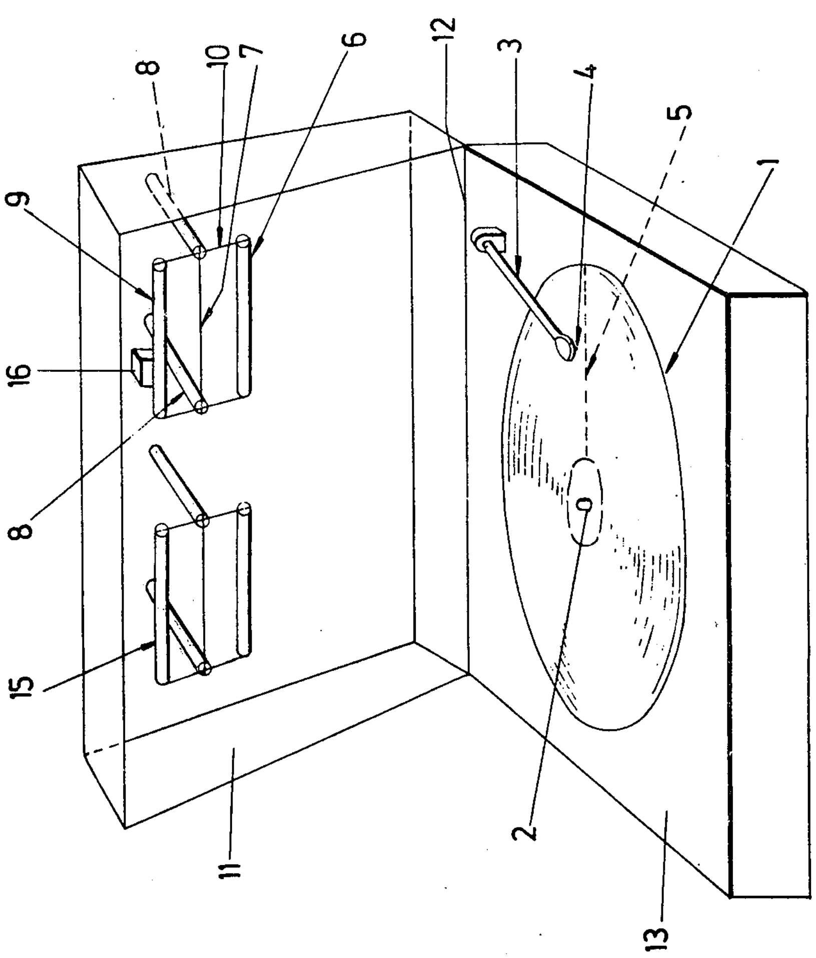
1
2
3
4
5
6
7
8
8
9
10
11
12
13
15
16

METHOD AND APPARATUS FOR USE IN CLEANING A GRAMOPHONE DISC

This invention relates to a method and apparatus for use in cleaning a gramophone disc.

It is well known to clean dust from the surface of a gramophone disc by wiping a pad of velvet or plush material around the surface of the disc or by allowing a pad of such material, generally together with a brush, to ride on a disc as it rotates in such a way that it travels from the edge of the disc towards its centre.

The present invention provides an arrangement in which a cleaner makes a large number of sweeps of a disc with a low pressure on the disc and a minimum of involvement of the user. The arrangement has the advantage that the track is cleaned before and after being played so that dust dislodged during playing can also be collected.

An embodiment of the invention will now be described with reference to the single FIGURE of the accompanying drawing which shows a perspective view of a gramophone apparatus with its cover raised.

Referring to the drawing, there is shown a recorded disc 1 rotatable about the centre spindle 2 of the turntable of a gramophone. A stylus arm 3 is shown with its playing stylus 4 resting on the disc 1. A plush cleaning element 6 in the form of a roll is mounted on a frame 10 which is pivoted on a rod 7 mounted on trunnions 8. The trunnions 8 are mounted on a lid 11 which is hinged at 12 to the base 13 of the apparatus. A counterbalance weight 9 is mounted on the frame 10 in such a way that when the lid 11 is closed the frame 10 pivots about the rod 7 so that the roll 6 rests with ideal pressure on the disc 1 along the dotted line 5. The line 5 is clear of the stylus 4 so that the stylus is not interfered with. The cleaning element 6 may, of course, be in some other known form, for example a brush or a plush pad. The cleaning element 6 can be made so that it is readily detachable from the frame 10 and other forms of mounting can be used. Furthermore, it can be arranged that the element 6 is applied to the surface of the disc 1 under its own weight and without the benefit of a counterbalance weight. Alternatively the element can be applied under the influence of spring pressure which can be adjusted and the mounting can be such that the element 6 is suspended from the lid by some other arrangement than a pivoted assembly.

When a counterbalanced cleaner configuration is utilised the cleaner element and counterbalance weight may be juxtaposed with respect to the positions that they occupy in the FIGURE. This represents a superior configuration, but care must be taken that the cleaner in no way fouls or intereferes with the pickup arm. Furthermore, the cleaning location may be anywhere (within the constraints imposed by the non-interference with the pickup arm) around the record and need not be immediately adjacent to the stylus.

The element 6 can be in the form of a plush or brush roll mounted so that it can be rotated about its longitudinal axis, but not rotatable under the influence of friction between it and the disc. In this way the element 6 can be rotated, as desired by a user, so as to present a clean unworn surface to the disc.

In a further embodiment, the cleaning element is split into discrete sections or provided by a plurality of the elements shown, each cleaning an annular shaped area of the disc. These annular areas can have a broad correlation with the various disc sizes. E.g. one section of the cleaning element or one element would clean a 7" disc, two would clean a 10" disc and three would clean a 12" disc. Thus a second element 15, supported in the same way as the element 6, can be arranged to clean a different, though possibly overlapping, annular area from the element 6. The cleaning elements are restrained from moving towards the turntable by more than a predetermined amount, for example by a back stop 16 behind the counterbalance weight 9, so that, in the absence of a record on the turntable, or when the record is of a size such that there is an element beyond its edge, the turntable is not touched by an element. Of course, an even greater number of cleaning elements could be used. The greater the number of elements, the less critical would any warping of the disc be, as far as adequate cleaning was concerned. To improve the cleaning of warped discs further, the cleaning elements, or sections, can be independently pivoted at each of their ends so that it would be possible for the cleaning elements, or sections, to follow the variations in the surface levels of portions of a disc and to adopt attitudes which were not necessarily parallel to the surface of the turntable on which the disc rested.

It will be appreciated that, although in the preferred embodiment the cleaning element is supported by the lid 11 and that this arrangement has the advantage that the simple action of closing the lid results in the cleaning element being applied to the record, the element could be applied in other ways, for example it could be attached to a cantilever arm which, in turn, is supported by a short column on the base 13. Such a cantilever arm can be counterbalanced to enable the element to rest on the record with the correct weight and by making a part of the supporting column rotatable it is possible to move the arm away from the turntable thereby enabling records to be loaded on and removed from the turntable. Although, in the particular embodiment described the cleaning element 6 is shown as extending radially across the disc record 1 along the dotted line 5 when in the cleaning position, it will be understood that the element 6 could be arranged at some other angle across the surface of the disc or record.

We claim:

1. In combination:

a turntable for receiving and rotating a grooved phonograph record;

a lid for said turntable;

a tone arm mounted on said turntable for tracking the grooves of said record;

a cleaning element; and means for mounting said cleaning element on said lid for movement between a position out of contact with a record on said turntable and a position wherein said element contacts a constant annular area of the top surface of said record and extends along the surface of said record so as to clean the top surface of said record as said record rotates on said turntable.

2. In combination according to claim 1 wherein the said mounting means includes a counterbalance weight to control the pressure of the cleaning element upon a disc record.

3. In combination according to claim 1 including a plurality of said cleaning elements.

* * * * *